Oct. 16, 1923.　　　　　　　　　　　　　　　　1,470,670
O. HEIMSTÄDT
STEREOSCOPIC EYEPIECE FOR MICROSCOPES
Filed Feb. 23, 1921
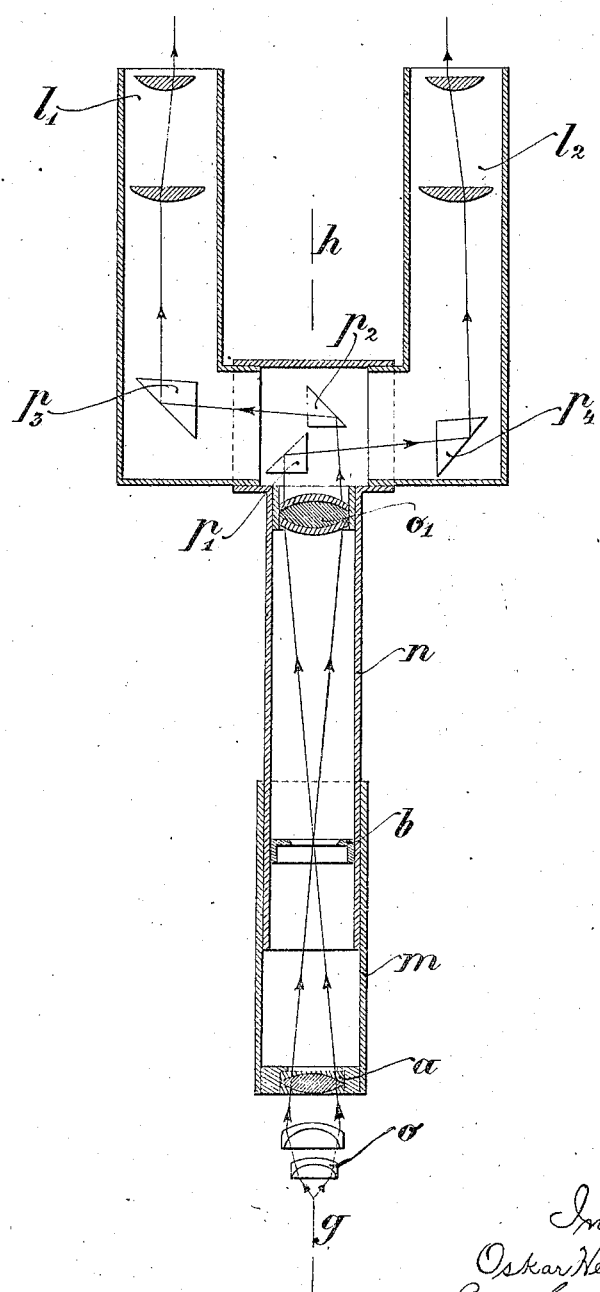
Inventor
Oskar Heimstädt
By  
　　atty.

Patented Oct. 16, 1923.

1,470,670

UNITED STATES PATENT OFFICE.

OSKAR HEIMSTÄDT, OF VIENNA, AUSTRIA.

STEREOSCOPIC EYEPIECE FOR MICROSCOPES.

Application filed February 23, 1921. Serial No. 447,097.

(GRANTED UNDER THE PROVISIONS OF THE ACT OF MARCH 3, 1921, 41 STAT. L., 1313.)

*To all whom it may concern:*

Be it known that I, OSKAR HEIMSTÄDT, optician, a citizen of the German Republic, and residing at Vienna, in the Republic of Austria, have invented certain new and useful Improvements in or Relating to Stereoscopic Eyepieces for Microscopes (for which I have obtained patents in Germany, filed July 29, 1919, granted Nov. 10, 1920, No. 332025, and No. 339013, filed July 24, 1920, granted May 10, 1921; in France, filed October 21, 1920, granted June 29, 1921, No. 526308; in Italy, filed November 3, 1920, No. 128/549; Great Britain, filed July 29, 1920, No. 149636, and No. 167130, filed October 21, 1920, and Austria, No. 86836, filed January 19, 1920, granted October 6, 1921); and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention has reference to such microscopes which allow a stereoscopic observation of the objects also in case of greater enlargement, but whereby a single objective is used.

Such stereo-microscopes are provided with an additional double microscope adapted for stereoscopic observation, which embodies one or two objectives and two eye-pieces. By means of this double microscope the real image of the object, projected by the primary objective and produced by a pencil of rays, the outer rays of which form a larger angle with the axis of the pencil of rays is seen.

The subject matter of the present invention consists in the conversion of such a stereo-microscope into a stereoscopic eye-piece for microscopes which can be employed with the usual stands.

The optical arrangement of such an eye-piece as diagrammatically illustrated in the accompanying drawing, consists of an additional double microscope provided with only one objective lens $o^1$, by means of which observation is made of the image produced in the plane of the diaphragm $b$ by the primary microscope objective $o$ and by the positive auxiliary system $a$.

It has been found that the spherical relief effect of a double microscope comprising a single objective, is the more striking, the larger the exit pupils of the instrument. This phenomenon can be explained in the following manner. A stereoscopic effect can be obtained even with a monocular microscope, provided an objective of large lens diameter, such, (for instance as that listed by many large firms as objective No. 3) be employed in combination with a low-power eye-piece, usually listed as No. I or II. The exit pupil of the instrument then becomes larger than the pupil of the observer's eye which is consequently able by movements of the head, either voluntary or involuntary to perceive the parallactic differences of the image projected by the objective and thus to realize a conception of contour or configuration in space. That these conditions also play an important part in binocular vision or observation will be apparent if the iris diaphragm of the microscope be contracted so as to reduce the exit pupils of the stereoscopic microscope.

The size of the exit pupils is, however, a function of the magnification as the less the latter, the greater will be the former. The stereoscopic relief, when increased to the highest degree is, consequently, accompanied by considerable loss of magnifying power, this drawback, however, becoming unimportant under the special circumstances of the present arrangement.

A large increase of the exit pupils may be obtained in the following manner: The positive auxiliary system $a$ is brought as close as possible to the primary microscope objective lens $o$, thus reducing the length of the combination. This position of the auxiliary system is at the same time adapted also to secure a large visual field together with uniform illumination. The focal length of the auxiliary system $a$ and that of the microscope objective lens $o^1$ must be so chosen that the width of the pencil of rays proceeding from an object point situated upon the optical axis falling on the objective $o^1$ is larger than that leaving the microscope objective $o$; that is to say that the strength of the auxiliary system $a$ is such that the rear focal length of the combination of $o$ and $a$ taken together is less than the front focal length of $o^1$, as is clearly shown by the course of the lines marked with arrow heads which indicate the course of the rays of light proceeding from an object point up to their emergence from the eye-piece. Instead of the diaphragm $b$, where the primary image is produced, there can be employed what may be styled a field lens, this being especially advantageous when the eye-piece is to be employed in combination with a low power objective for the purpose of making microscopical preparations.

As is the case in former stereoscopic microscopes, what is commonly termed the sharpness of the two divided images is impaired by the separation of the individual pencils of rays forming the image. This defect is, however, materially reduced in consequence of the fact that the two partial pencils into which the light is separated by the prisms $p^1$ and $p^2$ are of unlike diameter, this being simply attained by giving an eccentric position to these prisms, so that the separating edge of the prism $p^1$ does not lie on the optical axis of the lens $o^1$, indicated by the broken line $g\ h$, but is laterally displaced to a certain extent as shown by the drawings. The result of this arrangement is that the sharpness of the image which is formed by the pencils with a large cross section is perceptibly increased. The second image which is then of substantially lower luminosity and also generally inferior, has for its sole function the production of apparent (superficial) inequality through its parallactic difference, the transmission of details being performed entirely by the first image.

The difference in the diameters of the individual object glasses results in causing the two shares or parts into which the cone or pencil is separated to take up different positions with one and the same eccentricity of the prism position. These differences can be compensated for by adjusting the casing $k$ carrying the prisms in relation to the objective $o^1$. The slight displacement of the two divided images which occurs in this way as it takes place in the same direction, does not affect the stereoscopic effect at all and affects the stereoscopic image as such only very slightly, more especially as the displacements of the prisms are but slight in relation to the objective $o^1$.

The constructional forms of stereo-microscopes without crossing the pencils producing the partial images are all pseudoscopic. The transposition of the images to yield stereoscopic relief can, however, be effected by known means, as for instance by the Nachet prism combination. In the present constructional form of stereoscopic microscope there is adopted a new type of image transposition, which has the advantage of enabling the instrument to be very compactly built up. The arrangement of the two separating prisms is in this construction such that their adjacent surfaces are not hypothenuse surfaces but surfaces bounding the right angles whilst the prisms are staggered or displaced in relation to each other to the extent of their own height, so that the partial pencils or rays coming from each of the prisms $p^1$, $p^2$ can pass through without obstruction by the other prism. The division of the pencil of rays commences at the edge of the lower prism $p^1$, and takes place along the plane common to the two surfaces turned towards each other. After transposition the two parts of the divided pencil of rays are taken up by the deflecting prisms $p^3$ and $p^4$ which are rigidly connected to the tubes carrying the eye-pieces $l^1$ and $l^2$ and are simultaneously displaceable for adjustment to the interocular distance of the observer.

If for the primary microscope objective $o$ there be substituted a magnifying glass that can be slid upon the tube carrying the auxiliary system $a$ the eye-piece will then become an orthoscopic magnifying glass with a stereoscopic effect and of a working distance dependent upon the focal length of the magnifying glass sliding upon it. The same effect can also be obtained if the auxiliary lens system $a$ be so arranged that it can be moved in opposition to the object glass $o^1$ of the double microscope, so as to vary the distance between them. The drawing shows such an arrangement wherein the tube $m$ carrying the lens $a$ slides on the inner tube $n$.

Finally the stereoscopic eye-piece may if desired be connected with the objective lens of a telescope. Through the parallactic differences of the image formed by the telescope objective there will also arise, as in the case of the microscope, a stereoscopic effect which although less than with a double telescope is still distinctly observable. If the eye-piece be frequently used in the open air or out of doors as a magnifying glass, after the manner of the so called vivoscope, this simple transformation into a telescope which, by removal of the tube part carrying the lens and the substitution of another which, however, carries a telescope with long focal distance, will certainly be welcome. On passing over from its working position as microscope eye-piece into its position of use as a magnifying glass, which is effected by displacement of the auxiliary system $a$, the auxiliary lens adopts a position in which the path of rays through the instrument is telecentric, so that it acts as a telescope, the magnifying power, however, owing to the short focal distance of the auxiliary system $a$, being too low and necessitating the substitution of the latter by a telescope objective lens with a long focal distance.

What I claim is:

1. The combination of a microscope having a primary objective, and an auxiliary system, a binocular eye-piece for the microscope having a single objective lens, and means whereby the auxiliary system may be brought close to the primary objective, the combined focal length of the latter and the auxiliary system being less than the focal length of the objective lens.

2. The combination with a microscope having a primary objective, and an auxiliary system, of a binocular eye-piece for the microscope having a single objective lens, and means for adjusting the auxiliary system relatively to the primary objective whereby the combined rear focal length of the primary objective and the auxiliary system is less than the front focal length of the single objective lens.

3. The combination with a microscope having an image producing primary objective, and an auxiliary system, of a binocular eye-piece for the microscope having a single objective lens, and prisms mounted in the eye piece for effecting the separation of the pencil of rays, said prisms being arranged eccentrically in relation to the objective lens of the binocular eye-piece.

4. The combination with a microscope having an image producing primary objective, and an auxiliary system, of a binocular eye-piece for the microscope having a single objective lens, means for adjusting the auxiliary system relatively to the primary objective, prisms mounted in the eye piece for effecting the separation of the pencil rays and having their separating edges arranged eccentrically to the objective lens, and means for adjusting the prisms with relation to the latter.

5. The combination with a microscope having an image producing primary objective, and an auxiliary system, of a binocular eye-piece for the microscope having a single objective lens, means for adjusting the auxiliary system relatively to the primary objective, a pair of right angled prisms mounted in the eye-piece for the transposition of the image formed by the separation of the pencil rays, said prisms having two surfaces in approximately the same plane and in staggered relation to each other.

6. The combination of a microscope having a primary objective, and an auxiliary system, a binocular eye-piece for the microscope having a single objective lens, a tube carrying the auxiliary system telescopically connected with the microscope whereby said auxiliary system may be adjusted relatively to the primary objective, and prisms mounted in the eye pieces for effecting the separation of the pencil rays and having surfaces in approximately the same plane, and in staggered relation to each other to the extent of their height.

In testimony that I claim the foregoing as my invention, I have signed my name.

OSKAR HEIMSTÄDT.